United States Patent [19]

Harada et al.

[11] Patent Number: 5,670,084

[45] Date of Patent: Sep. 23, 1997

[54] ALIGNMENT LAYER MATERIAL FOR LIQUID CRYSTAL DISPLAY DEVICES

[75] Inventors: Takamasa Harada, Inzai-machi; Haruhiko Itoh, Kakegawa; Masami Ubukata, Tokorozawa; Fumie Nozawa, Asaka, all of Japan

[73] Assignee: Hoechst Aktiengesellschaft, Frankfurt, Germany

[21] Appl. No.: 546,221

[22] Filed: Oct. 20, 1995

[30] Foreign Application Priority Data

Oct. 21, 1994 [JP] Japan .................................. 6-256859
Oct. 6, 1995 [JP] Japan .................................. 7-259902

[51] Int. Cl.$^6$ ........................ C09K 19/56; G02F 1/1337
[52] U.S. Cl. ........................ 252/299.01; 252/299.4; 349/135; 428/1
[58] Field of Search ........................ 252/299.01, 299.4; 359/75; 349/135; 428/1

[56] References Cited

U.S. PATENT DOCUMENTS

| | | | |
|---|---|---|---|
| 4,782,115 | 11/1988 | Paul et al. | 525/67 |
| 4,861,829 | 8/1989 | Kress et al. | 525/92 |
| 5,118,759 | 6/1992 | Jung et al | 525/148 |
| 5,200,238 | 4/1993 | McArdle et al. | 359/75 |
| 5,437,813 | 8/1995 | Akashi et al. | 282/299.01 |
| 5,520,845 | 5/1996 | Auman et al. | 252/299.4 |

FOREIGN PATENT DOCUMENTS

| | | |
|---|---|---|
| 0225518 | 6/1987 | European Pat. Off. . |
| 0376921 | 7/1990 | European Pat. Off. . |
| 0415199 | 3/1991 | European Pat. Off. . |
| 0604885 | 7/1994 | European Pat. Off. . |
| 211836 | 10/1971 | Germany . |
| 1353501 | 5/1974 | United Kingdom . |

*Primary Examiner*—Shean C. Wu
*Attorney, Agent, or Firm*—Curtis, Morris & Safford, P.C.

[57] ABSTRACT

The object of the present invention is to provide an alignment layer material for forming a liquid crystal alignment layer having an excellent adhesion to a glass substrate, having less dependency of display characteristics on the viewing angle with a high contrast.
(Constitution)

A composition used for an alignment layer material comprising a mixture of a polymer (A) which is a block copolymer containing a siloxane compound as a constituting component, and a homopolymer or copolymer (B) having the following repeating unit (1):

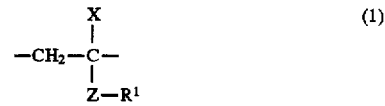

is disclosed.

19 Claims, No Drawings

ALIGNMENT LAYER MATERIAL FOR LIQUID CRYSTAL DISPLAY DEVICES

[DETAILED DESCRIPTION OF THE INVENTION]

1. (Field of Utility in Industry)

This invention relates to an alignment layer material for a liquid crystal display device, an alignment layer and a liquid crystal display device having the alignment layer. More specifically, the present invention relates to an alignment layer using a mixture of specific polymer compounds as a material therefor, and a liquid crystal display device having a wider viewing angle provided with such an alignment layer.

2. (Prior Art)

A liquid crystal display device is an electrooptical device comprising a liquid crystal material whose optical characteristics vary according to an external electrical field. For example, in a TN (twisted nematic) type liquid crystal display device, a liquid crystal alignment layer is provided on the surface of a solid substrate so that a liquid crystal molecule on the surface of the substrate is in a uniform orientation state to the surface, and the surface is subjected to a rubbing treatment. That is, a liquid crystal alignment layer is obtained by preparing a thin film of a heat-resistant polymer such as a polyimide, a polyamide and a polyimidoamide on a solid substrate such as a glass plate by spin-coating printing, dipping or the like, drying or curing the film thus-prepared, and then rubbing the film in one direction with a cloth or the like. Thus, a liquid crystal molecule is aligned in one direction by the resulting liquid crystal alignment layer and, at the same time, tilted generally about 2 to 4 degrees to the surface of the substrate (pretilt angle). Other methods include the oblique vapor deposition of an inorganic material such as silicon oxide on a substrate, but this method is not industrially efficient from the standpoints of cost, processing time, etc. and is not generally used. However, with use of any of the above-described alignment materials, there is a problem in that, as characteristics of this method, dependency on a viewing angle from a certain direction is not satisfactory and, when the viewing angle is deviated only to a few ten degrees from the front surface, the display tends to be black-and-white reversed.

Further, a display device with super twisted birefringent effects (STN) which is excellent in display characteristics has been developed for large-sized displays (T. J. Scheffer and J. Nehring, Appl. Phys. Lett. 45 (10), 1021 (1984)). For obtaining the super twisted birefringent effects, a nematic liquid crystal blended with a chiral agent as an optically active material is used. In such a display device, liquid crystal molecules twist at 180 to 270 degrees in the liquid crystal display device as compared with a TN type device which twists at about 90 degrees, and the larger the twist angle, the better the dependence upon the viewing angle. However, this viewing angle characteristics is still unsatisfactory.

Also, in order to improve the viewing angle characteristics, a pixel dividing method (Y. Toko, Y. Iimura et al., SID 93 Digest 622) and a method of random domain (Y. Toko, T. Sugiyama et al., J.A.P. 74, 2071 (1993)) have been proposed. However, in the pixel dividing method, there is a cost problem in that number of steps in the production process thereof increase as compared with general production processes since lithography techniques, etc. are used, and the formation of random domains has problems in that the contrast of the display decreases.

(Problems to be Solved by the Invention)

Accordingly, an object of the present invention is to solve the above-described problems and to provide a liquid crystal alignment layer having excellent adhesion to a glass substrate, having less dependency of the display characteristics on the viewing angle and a high contrast, and to provide a liquid crystal display device provided with such an alignment layer.

(Means for Solving the Problems)

The present invention provides a composition for use as an alignment layer material of a liquid crystal display device having a liquid crystal layer between a pair of substrates wherein a transparent electrode and an alignment layer are formed in this order on this inside thereof. The composition comprises a mixture of a polymer (A) which is a block copolymer comprising a siloxane compound as a constituting component, and a homopolymer or copolymer (B) having the following repeating unit (1) and having an orientation anisotropy to a rubbing direction:

wherein X represents —H, —F, —$CH_3$, —$CF_3$, —CN or —$CH_2$—$CH_3$; Z represents a single bond —O—, —(C=O)—, —(C=O)—O—, —O—(C=O)—, or —O—(C=O)—($CH_2$)$_n$—(C=O)—O— (wherein n is an integer of from 0 to 20); and $R^1$ represents a hydrogen atom, a straight chain or a branched alkyl group, a straight chain or branched unsaturated aliphatic hydrocarbon group, preferably having from 1 to 20 carbon atoms, a cycloalkyl group, preferably having from 3 to 10 carbon atoms, an aryl group, preferably having from 6 to 10 carbon atoms, a saturated or unsaturated hetero ring, preferably having from 4 to 10 carbon atoms and 1, 2 or 3 N, O and/or S atoms, or a derivative thereof, preferably aryl groups or hetero rings which are substituted with 1, 2 or 3 groups —X, —$R^1$ or —Z—$R^1$.

Also, the present invention provides an alignment layer made of the above-described alignment layer material. Further, the present invention provides a liquid crystal display device having a liquid crystal layer between a pair of substrates wherein a transparent electrode and an alignment layer are formed in order in the inside thereof, characterized in that the above-described alignment material is used as an alignment layer material for at least one of the alignment layers on the facing surfaces of a pair of the substrates.

The polymer (A) used in the present invention is a block copolymer comprising a siloxane component. The polymer (A) is preferably a polyamide, polyurethane, polyester, polyimide, polycarbonate, polyurea or polyimidoamide.

The polymer (A) can be obtained by polymerizing compounds represented by the following general formula (2) as one of the component:

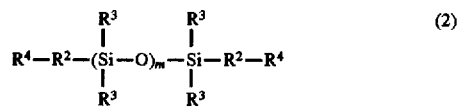

wherein m is an integer of 1 or more;

$R^2$ is a divalent hydrocarbon group;

$R^3$ is a monovalent straight chain or branched chain aliphatic hydrocarbon group having from 1 to 5 carbon atoms, an alicyclic hydrocarbon group or an aromatic hydrocarbon group; and $R^4$ is —$NH_2$, —OH, —COOH, Ar(COOH)$_2$, Ar(CO)$_2$O or —NHSi(CH$_3$)$_3$ wherein Ar represents an aromatic group.

Preferably $R^2$ is an alkylene group having from 1 to 10 carbon atoms.

Examples of the aliphatic hydrocarbon group for $R^3$ include the methyl group, the ethyl group, the propyl group, the isopropyl group, the n-butyl group, the isobutyl group, the t-butyl group and the pentyl group. Examples of the alicyclic hydrocarbon group for $R^3$ include the cyclopropyl group, the cyclobutyl group, the cyclopentyl group and the cyclohexyl group. Examples of the aromatic hydrocarbon group for $R^3$ include the phenyl group, the tolyl group, the xylyl group, the biphenyl group, the naphthyl group, the anthryl group and the phenanthryl group. The aromatic ring may be substituted with a halogen atom, a nitro group, a alkyl group, etc. $R^3$'s may be different. A preferred $R^3$ is a methyl group.

In the formula (2), m is preferably 5 or more. However, if the degree of polymerization of the polysiloxane is too high, the strength of the alignment layer material tends to decrease and, therefore, m is preferably 100 or less.

The constituting components of the polymer (A) other than the siloxane component can be obtained by polymerizing a monomer such as a diisocyanate, a diol, a dicarboxylic acid, a diamine and a tetracarboxylic anhydride. These monomers may contain fluorine atoms.

Examples of the diisocyanate include ethylene diisocyanate, propylene diisocyanate, tetraethylene diisocyanate, hexamethylene diisocyanate, m-phenylene diisocyanate, p-phenylene diisocyanate, 2,4-tolylene diisocyanate, 2,6-tolylene diisocyanate, 1,5-naphthylene diisocyanate, 4,4'-diphenylmethane diisocyanate, 3,3'-dimethyl-4,4'-diphenylene diisocyanate, m-xylylene Examples of the diol include ethylene glycol, propylene glycol, trimethylene glycol tetramethylene glycol, pentamethylene glycol, hexamethylene glycol, decamethylene glycol, diethylene glycol, triethylene glycol, cyclohexanedimethanol, p-xylylene glycol, hydroquinone, resorcinol, 4,4'-dihydroxydipenyl, 2,2'-dihydroxydiphenyl, 4,4'-dihydroxydiphenylsulfone, 4,6-dihydroxynaphthalene, 4,4'-dihydroxydiphenylmethane, 4,4'-dihydroxydiphenyl-1,1-ethane, 4,4'-dihydroxydiphenyl-1,1-butane, 4,4'-dihydroxydiphenyl-1,1-isobutane, 4,4'-dihydroxydiphenyl-1,1-cyclohexane, 4,4'-dihydroxydiphenyl-2,2-propane, 4,4'-dihydrodiphenyl-2,2-butane, 4,4'-dihydroxydiphenyl-2,2-hexane, 4,4'-dihydroxydiphenyl sulfide, 4,4'-dihydroxydiphenyl sulfoxide, 4,4'-dihydroxysulfone, 4,4'-dihydroxydiphenyl ether, 3,4'-dihydroxydiphenyl ether, 2,2-(4,4'-dihydroxydiphenyl)propane, 2,2'-bis(4-hydroxycyclohexyl)propane, 2,2'-bis(4-hydroxy-3,5-dimethylphenyl)propane, 1,4-bis(2-hydroxyethoxy)benzene, bis[4-(2-hydroxyethoxy)phenyl]sulfone, 1,3-bis[N-(2-hydroxyethyl)-4-piperidyl]propane, 1,3-bis(4-hydroxyphenoxy)benzene, 1,4-bis(3-hydroxyphenoxy)benzene, 2,2-bis(4-hydroxyphenyl)butane, α,α'-bis(4-hydroxyphenyl)-1,4-diisopropylbenzene, 4,4'-dihydroxydiphenyl sulfide, 1,5-dihydroxynaphthalene, 4,4-dihydroxydiphenylethane, methylhydroquinone, methylresorcinol, 3,4'-dihydroxybenzanilide, 3,3'-dichloro-4,4-dihydroxydiphenyl, 3,3'-dihydroxydiphenylamine, 3,3'-dihydroxydiphenyl sulfone, 3,4'-dihydroxydiphenylmethane, 3,4'-dihydroxydiphenyl sulfone, 2,2-(3,4'-dihydroxydiphenyl)propane, 3,4'-dihydroxydiphenyl sulfide, 3,4'-dihydroxybenzanilide and 1,1-(3,4'-dihydroxydiphenyl)cyclohexane.

Examples of the dicarboxylic acid include isophthalic acid, phthalic acid, terephthalic acid, diphenylacetic acid, diphenyl ether-p,p'-dicarboxylic acid, diphenylsulfone-p,p'-dicarboxylic acid, diphenylmethane-p,p'-dicarboxylic acid, diphenylmethane-m,m'-dicarboxylic acid, diphenylethane-p,p'-dicarboxylic acid, benzophenone-4,4'-dicarboxylic acid, diphenylbutane-p,p'-dicarboxylic acid, naphthalene-1,4-dicarboxylic acid, naphthalene-1,5-dicarboxylic acid, naphthalene-2,6-dicarboxylic acid, m-phenylenediglycolic acid and p-phenylenediglycolic acid. Also, the dicarboxylic acid dichlorides include dichlorides of the above-described carboxylic acids.

Examples of the diamine include aliphatic or alicyclic diamines such as 1,1-metaxylylenediamine, 1,3-propanediamine, tetramethylenediamine, pentamethylene diamine, hexamethylenediamine, octamethylenediamine, nonamethylenediamine, 4,4'-diaminoheptamethylenediamine, 1,4-diaminocyclohexene, isophoronsdiamine, tetrahydrodicyclopentadiethylenediamine, hexahydro-4,7-methanoindanylenedimethylenediamine and tricyclo[6,2,1,0,2,7]-undecylenedimethyldiamine. Examples of aromatic diamines include m-phenylenediamine, p-phenylenediamine, 4,4'-diaminodiphenylmethane, 4,4'-diaminodiphenyl ether, 4,4'-diaminodiphenylsulfone, 2,2-(4,4'-diaminodiphenyl)propane, 4,4'-diaminodiphenylsulfide, 1,5-diaminonaphthalene, 4,4'-diaminodiphenylethane, m-toluenediamine, p-toluenediamine, 3,4'-diaminobenzanilide, 1,4-diaminonaphthalene, 3,3'-dichloro-4,4'-diaminodiphenyl, benzidine, 4,4'-diaminodiphenylamine, 4,4'-diaminodiphenyl-N-methylamine, 4,4'-diaminodiphenyl-N-phenylamine, 3,3'-diaminodiphenylsulfone, 4,4'-diaminodiphenyldiethylsilane, 4,4'-diaminodiphenylsilane, 3,4'-diaminodiphenylmethane, 1,1-diaminodiphenylethane, 3,4'-diaminodiphenyl ether, 3,4'-diaminodiphenylsulfone, 2,2-(3,4'-diaminodiphenyl)propane, 3,4'-diaminodiphenyl sulfide, 3,4'-diaminobenzanilide, 3,4'-diaminobenzophenone, 1,1-(3,4'-diaminodiphenyl)cyclohexane, 1,1-(3,4'-diaminodiphenyl)cyclopentane, 2,5,2',5'-tetramethyl-3,4'-diaminodiphenylmethane, 2,5,2',5'-tetramethyl-3,4'-diaminodiphenyl ether, 2,5,2',5'-tetramethyl-3,4'-diaminodiphenylsulfone, 2,5,2',5'-tetramethyl-3,4'-diaminodiphenyl sulfide, 2,5,2',5'-tetramethyl-3,4'-diaminobenzanilide, 2,5,2',5'-tetramethyl-3,4'-diaminobenzophenone, 2,2'-dichloro-3,4'-diaminodiphenylmethane, 2,2'-dichloro-3,4'-diaminodiphenyl ether, 2,2'-dibromo-3,4'-diaminodiphenylsulfone, 2,2-bis[4-(4-aminophenoxy)phenyl]propane, 2,2-bis[3-methyl-4-(4-aminophenoxy)phenyl]propane, 2,2-bis[3-bromo-4-(4 -aminophenoxy)phenyl]propane, 2,2-bis[3-ethyl-4-(4-aminophenoxy)phenyl]propane, 2,2-bis[3-propyl-4-(4-aminophenoxy)phenyl]propane, 2,2-bis[3-isopropyl-4-(4-aminophenoxy)phenyl]propane, 2,2-bis[3-butyl-4-(4-aminophenoxy)phenyl]propane, 2,2-bis[3-sec-butyl-4-(4-aminophenoxy)phenyl]propane, 2,2-bis[3-methoxy-4-(4-aminophenoxy)phenyl]propane, 2,2-bis[3-ethoxy-4-(4-aminophenoxy)phenyl]propane, 2,2-bis[3,5-dimethyl-4-(4-aminophenoxy)phenyl]propane, 2,2-bis[3,5-dichloro-4-(4-aminophenoxy)phenyl]propane, 2,2-bis[3,5-dibromo-4-(4-aminophenoxy)phenyl]propane, 2,2-bis[3,5-dimethoxy-4-(4-aminophenoxy)phenyl]propane, 2,2-bis[3-chloro-4-(4-aminophenoxy)-5-methylphenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3-bromo-4-(4- aminophenoxy)phenyl]ethane, 1,1-bis[3-ethyl-4-(4-aminophenoxy)phenyl]ethane, 1,1-bis[3-propyl-4-(4-aminophenoxy)phenyl]ethane, 1,1-bis[3-isopropyl-4-(4-aminophenoxy)phenyl]ethane, 1,1-bis[3-butyl-4-(4-aminophenoxy)phenyl]ethane, 1,1-bis[3-sec-butyl-4-(4-aminophenoxy)phenyl]ethane, 1,1-bis[3-methoxy-4-(4-aminophenoxy)phenyl]ethane, 1,1-bis[3-ethoxy-4-(4-aminophenoxy)phenyl]ethane, 1,1-bis[3,5-dimethyl-4-(4-aminophenoxy)phenyl]ethane, 1,1-bis[3,5-dichloro-4-(4-aminophenoxy)phenyl]ethane, 1,1-bis[3,5-dibromo-4-(4-aminophenoxy)phenyl]ethane, 1,1-bis[3,5-dimethoxy-4-(4-aminophenoxy)phenyl]ethane, 1,1-bis[3-chloro-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3-bromo-4-(4-aminophenoxy)phenyl]methane, bis[3-ethyl-4-(4-aminophenoxy)phenyl]methane, bis[3-propyl-4-(4-aminophenoxy)phenyl]methane, bis[3-isopropyl-4-(4-aminophenoxy)phenyl]methane, bis[3-butyl-4-(4-aminophenoxy)phenyl]methane, bis[3-sec-butyl-4-(4-aminophenoxy)phenyl]methane, bis[3-methoxy-4-(4-aminophenoxy)phenyl]methane, bis[3-ethoxy-4-(4-aminophenoxy)phenyl]methane, bis[3,5-dimethyl-4-(4-aminophenoxy)phenyl]methane, bis[3-dichloro-4-(4-aminophenoxy)phenyl]methane, bis[3,5-dibromo-4-(4-aminophenoxy)phenyl]methane, bis[3,5-dimethoxy-4-(4-aminophenoxy)phenyl]methane, bis[3-chloromethoxy-4-(4-aminophenoxy)phenyl]methane, 3,3-bis[4-(4-aminophenoxy)phenyl]pentane, 1,1-bis[4-(4-aminophenoxy)phenyl]propane, 3,3-bis[3,5-dimethyl-4-(4-aminophenoxy)phenyl]pentane, 1,1-bis[3,5-dimethyl-4-(4-aminophenoxy)phenyl]propane, 3,3-bis[3,5-dibromo-4-(4-aminophenoxy)phenyl]pentane, 1,1-bis[3,5-dibromo-4-(4-aminophenoxy)phenyl]propane, 2,2-bis[4-(4-aminophenoxy)phenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1-bis[4-(4-aminophenoxy)phenyl]cyclohexane, 1,1-bis[4-(4-aminophenoxy)phenyl]cyclopentane, bis[4-(4-aminophenoxy)phenyl]sulfone, bis[4-(4-aminophenoxy)phenyl]ether, bis[4-(3-aminophenoxy)phenyl]sulfone, 4,4-carbonylbis(p-phenyleneoxy)dianiline and 4,4'-bis(4-aminophenoxy)biphenyl.

Examples of the tetracarboxylic acid dianhydrides include aliphatic and alicyclic tetracarboxylic acid dianhydrides such as 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 2,3,3',4'-benzophenonetetracarboxylic acid dianhydride, 1,2,5,6-naphthalenetetracarboxylic acid dianhydride, 2,3,6,7-naphthalenetetracarboxylic acid dianhydride, thiophene-2,3,4,5-tetracarboxylic acid dianhydride, 2,2-bis(3,4-biscarboxyphenyl)propane dianhydride, 3,4-dicarboxyphenylsulfone dianhydride, perylene-3,4,9,10-tetracarboxylic acid dianhydride, bis(3,4-dicarboxyphenyl) ether dianhydride, cyclohexanetetracarboxylic acid dianhydride, butanetetracarboxylic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornane-2-acetic acid dianhydride, 5-(2,5-dioxotetrahydrofuryl)-3-methyl-cyclohexanedicarboxylic acid dianhydride, bicyclo[2.2.2]-oct-7-ene-tetracarboxylic acid dianhydride, and aromatic tetracarboxylic acid dianhydrides such as pyromellitic dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenyl ether tetracarboxylic acid dianhydride, 3,3'-4,4'-dimethylphenylsilanetetracarboxylic acid dianhydride, 3,3', 4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3', 4,4'-biphenyl ether tetracarboxylic acid dianhydride, bis (phthalic acid)phenylphosphine oxide dianhydride, p-phenyl-bis-(triphenylphthalic acid) dianhydride, m-phenylene-bis(triphenylphthalic acid) dianhydride, bis-(triphenylphthalic acid)-4,4'-diphenyl ether dianhydride and bis-(triphenylphthalic acid)-4,4'-diphenylmethane dianhydride.

The monomers containing a fluorine atom include the following compounds.

Examples of the diamine compound containing fluorine atoms include 2,2-bis(4-aminophenyl)-1,1,1,3,3,3-hexafluoropropane, 3,3-bis(4-aminophenyl)-1,1,1,2,2,4,4,5,5,5-decafluoropentane, 2,2-bis(4-aminophenyl)-1,1,1,3,3,4,4,4-octafluorobutane, 2,2-bis(3-aminophenyl)-1,1,1,3,3,3-hexafluoropropane, 2,2-bis{4-(4-aminophenoxy)phenyl}-1,1,1,3,3,3-hexafluoropropane, 2,2-bis{4-(4-aminophenoxy)phenyl}-1,1,1,2,2,4,4,5,5,5-decafluoropentane, 2,2-bis{4-(4-aminophenoxy)phenyl}-1,1,1,3,3,4,4,4-octafluorobutane, 2,2-bis{3-(4-aminophenoxy)phenyl}-1,1,1,3,3,3,-hexafluoropropane, 2,2-bis{4-(3-aminophenoxy)phenyl}-1,1,1,3,3,3-hexafluoropropane, 2,2-bis{3-(3-aminophenoxy)phenyl}-1,1,1,3,3,3-hexafluoropropane, 2,2-bis{4-(4-aminophenoxy)phenyl}-1,1,1,3,3,3-hexafluoropropane, 4,4'-diamino-3,3'-di(trifluoromethyl)biphenyl, 4,4'-diamino-3,3'-di(pentafluoroethyl)biphenyl, 4,4'-diamino-3,3'-di(pentafluoropropyl)biphenyl, 4,3'-diamino-3,4'-di(trifluoromethyl)biphenyl, 3,3'-diamino-4,4'-di(trifluoromethyl)biphenyl, 4,4'-diamino-3,3'-di(trifluoromethyl)-5,5'-di(pentafluoroethyl)biphenyl, 4,4'-bis(4-amino-3-trifluoromethylphenoxy)biphenyl, 4,4'-bis(4-amino-3-pentafluoroethyl)biphenyl, 3,3'-bis(4-amino-3-trifluoromethylphenoxy)biphenyl, 4,4'-bis(3-amino-4-trifluoromethylphenoxy)biphenyl, 4,4'-bis(4-aminophenoxy)-3,3'-ditrifluoromethylbiphenyl, 3,3'-bis(4-aminophenoxy)-4,4'-ditrifluoromethylbiphenyl, 4,4'-bis(4-aminophenoxy)-3,3'-dipentafluoroethylbiphenyl, 4,4'-(4-aminophenoxy)-3,3'-ditrifluoromethylbiphenyl, 2,2'-bis(4-amino-3-trifluoromethylbiphenyl)-1,1,1,3,3,3-hexafluoropropane, 2,2'-bis(4-amino-3-pentafluoroethyl)-1,1,1,3,3,3-hexafluoropropane, 3,3'-bis(4-amino-3-trifluoromethylphenyl)-1,1,1,2,2,4,4,5,5,5-decafluoropentane, 3,3'-bis(4-amino-3-pentafluoroethylphenyl)-1,1,1,2,2,4,4,5,5,5-decafluoropentane, 2,2'-bis{4-(4-aminophenoxy)-3-trifluoromethylphenyl}-1,1,1,3,3,3-hexafluoropropane, 2,2'-bis-{4-(4-amino-3-trifluoromethylphenoxy)}-1,1,1,3,3,3-hexafluoropropane, 4,4'-bis(4-amino-3-trifluoromethylphenoxy)-3,3'-di(trifluoromethyl)biphenyl and 2,2'-bis{4-(4-amino-3-trifluoromethylphenoxy)phenyl}-1,1,1,3,3,3-hexafluoropropane.

Examples of the diol containing fluorine atoms include 3,4'-dihydroxydiphenyldifluoromethane and 2,2-(3,4'-dihydroxydiphenyl)hexafluoropropane.

Examples of the diamine compound containing fluorine atoms include 2,2-bis(4-carboxyphenyl)-1,1,1,3,3,3-hexafluoropropane, 3,3-bis(4-carboxyphenyl)-1,1,1,2,2,4,4,5,5,5-decafluoropentane, 2,2-bis(4-carboxyphenyl)-1,1,1,3,3,4,4,4-octafluorobutane, 2,2-bis(3-carboxyphenyl)-1,1,1,3, 3,3-hexafluoropropane, 2,2-bis{4-(4-carboxyphenoxy) phenyl}-1,1,1,3,3,3-hexafluoropropane, 3,3-bis{4-(4-carboxyphenoxy)phenyl}-1,1,1,2,2,4,4,5,5,5-decafluoropentane, 2,2-bis{4-(4-carboxyphenoxy)phenyl}-1,1,1,3,3,4,4,4-octafluorobutane, 2,2-bis{3-(4-carboxyphenoxy)phenyl}-1,1,1,3,3,3-hexafluoropropane, 2,2-bis{4-(3-carboxyphenoxy)phenyl}-1,1,1,3,3,3-hexafluoropropane, 2,2-bis{3-(3-carboxyphenoxy)phenyl}-1,1,1,3,3,3-hexafluoropropane, 2,2-bis{4-(4-carboxyphenoxy)phenyl}-1,1,1,3,3,3-hexafluoropropane, 4,4'-dicarboxy-3,3'-di(trifluoromethyl)biphenyl, 4,4'-dicarboxy-3,3'-di(pentafluoroethyl)biphenyl, 4,4'-dicarboxy-3,3'-di(pentafluoropropyl)biphenyl, 4,3'-dicarboxy-3,4'-di(trifluoromethyl)biphenyl, 3,3'-dicarboxy-4,4'-di(trifluoromethyl)biphenyl, 4,4'-dicarboxy-3,3'-di(trifluoromethyl)-5,5'-di(pentafluoroethyl)biphenyl, 4,4'bis(4-carboxy-3-trifluoromethylphenoxy)biphenyl, 4,4'-bis(4-carboxy-3-pentafluoroethyl)biphenyl, 3,3'-bis(4-carboxy-3-trifluoromethylphenoxy)biphenyl, 4,4'-bis(4-carboxy-4-trifluoromethylphenoxy)biphenyl, 4,4'-bis(4-carboxyphenoxy)-3,3'-ditrifluoromethylmethylbiphenyl, 3,3'-bis(4-carboxyphenoxy)-4,4'-ditrifluoromethylbiphenyl, 4,4'-bis(4-carboxyphenoxy-3,3'-dipentafluoroethylbiphenyl, 4,4'-(4-carboxyphenoxy)-3,3'-ditrifluoromethylbiphenyl, 2,2'-bis(4-carboxy-3-trifluoromethylphenyl)-1,1,1,3,3,3-hexafluoropropane, 2,2'-bis(4-carboxy-3-pentafluoroethyl)-1,1,1,3,3,3-hexafluoropropane, 3,3'-bis(4-carboxy-3-trifluoromethylphenyl-1,1,1,2,2,4,4,5,5,5-decafluoropentane, 3,3'-bis(4-carboxy-3-pentafluoroethylphenyl)-1,1,1,2,2,4,4,5,5,5-decafluoropentane, 2,2'-bis{4-(carboxyphenoxy)-3-trifluoromethylphenyl}-1,1,1,3,3,3-hexafluoropropane, 2,2'-bis{4-(4-carboxy-3-trifluoromethylphenoxy}-1,1,1,3,3,3-hexafluoropropane, 4,4'-bis(4-carboxy-3-trifluoromethylphenoxy)-3,3'-di(trifluoromethyl)biphenyl and 2,2'-bis{4-(4-carboxy-3 trifluoromethylphenoxy)phenyl}-1,1,1,3,3,3-hexafluoropropane.

Examples of the carboxylic anhydride containing fluorine atoms include 2,2-bis(3,4-dicarboxyphenyl)-1,1,1,3,3,3-hexafluoropropane dianhydride, 3,3-bis(3,4-dicarboxyphenyl)-1,1,1,2,2,4,4,5,5,5-decafluoropentane dianhydride, 2,2-bis(3,4-dicarboxyphenyl)-1,1,1,3,3,4,4,4-octafluorobutane dianhydride, 2,2-bis{4-(3,4-dicarboxyphenoxy)phenyl}-1,1,1,3,3,3-hexafluoropropane dianhydride, 3,3-bis{4-(3,4-dicarboxyphenoxy)phenyl}-1,1,1,2,2,4,4,5,5,5-decafluoropentane dianhydride, 2,2-bis{4-(3,4-dicarboxyphenoxy)phenyl}-1,1,1,3,3,4,4,4-hexafluorobutane dianhydride, 2,2-bis{3-(3,4-dicarboxyphenoxy)phenyl}-1,1,1,3,3,3-hexafluoropropane dianhydride, 3,3-bis{3-(3,4-dicarboxyphenoxy)phenyl}-1,1,1,2,2,4,4,5,5,5-decafluoropentane dianhydride, 2,2-bis{3-(3,4-dicarboxyphenoxy)phenyl}-1,1,1,3,3,4,4,4-hexafluorobutane dianhydride, 3,3',4,4'-dicarboxy-5,5'-di(trifluoromethyl)biphenyl, 3,3',4,4'-dicarboxy-5,5'-di(pentafluoroethyl)biphenyl and 3,3',4,4'-dicarboxy-5,5'-di(pentafluoropropyl)biphenyl.

In the alignment layer material according to the present invention, the pretilt angle can be varied by changing the feeding amount of the siloxane compound at the time of synthesis of the polymer (A) and the molecular weight of the siloxane compound. The feeding amount of the siloxane compound, that is, a content of the siloxane constituting unit in the composition is from 0.1% to 80% by weight, preferably from 1% to 50% by weight.

In the alignment layer material according to the present invention, the intrinsic viscosity (η Inh) of the polymer (A) is generally from 0.05 dl/g to 10 dl/g (at 30° C.; as 0.5 g/dl solution in dimethyl acetamide), and preferably from 0.05 dl/g to 5.0 dl/g.

In the alignment layer material according to the present invention, the polymer (A) has preferably two or more glass transition points.

The polymer (B) used in the present invention has the property such that, if a long axis of a liquid crystal molecule is projected on the surface of substrate, it aligns the liquid crystal in the direction different from a rubbing direction. Alternatively, the polymer (B) has the property such that the liquid crystal has an anisotropy to the rubbing direction.

The polymer (B) has a molecular weight of preferably from 1,000 to 500,000 and more preferably from 10,000 to 200,000.

In the repeating unit (1) of the polymer (B) X represents —H, —F, —CH$_3$, —CF$_3$, —CN or —CH$_2$—CH$_3$, Z represents a single bond, —O—, —(C=O)—, —(C=O)—O—, —O—(C=O)— or —O—(C=O)—(CH$_2$)$_n$—(C=O)—O— (wherein n is an integer of from 0 to 20), and R$^1$ represents hydrogen, a straight chain or branched alkyl group, a straight chain or branched unsaturated aliphatic hydrocarbon group, a cycloalkyl group, an aryl group, a saturated or unsaturated hetero ring or a derivative thereof.

R$^1$ is preferably a straight or branched alkyl group having from 1 to 20 carbon atoms, particularly from 1 to 10 carbon atoms, a straight or branched unsaturated aliphatic hydrocarbon group, a cycloalkyl group or an aryl group. Examples of the aryl group include the phenyl group, the naphthyl group and the methyl phenyl group. Examples of the saturated or unsaturated hetero ring include 5- or 6-membered rings comprising N, O or S, and specific examples thereof include the following groups:

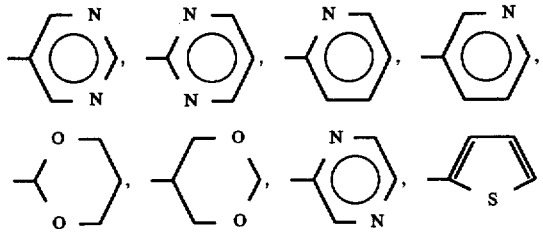

Examples of the polymer used as the polymer (B) of the present invention include poly(methyl methacrylate), poly (ethyl methacrylate), poly(butyl methacrylate), poly (isobutyl methacrylate), poly(t-butyl methacrylate), poly (hexyl methacrylate), poly(2-ethylbutyl methacrylate), poly (benzyl methacrylate), poly(cyclohexyl methacrylate), poly (methyl methacrylate-co-ethyl methacrylate), poly(methyl methacrylate-co-butyl methacrylate), poly(methyl methacrylate-co-isobutyl methacrylate), poly(methyl methacrylate-co-t-butyl methacrylate), poly(methyl methacrylate-co-2-ethylhexyl acrylate), poly(methyl methacrylate-co-2-ethylhexyl methacrylate), poly(methyl methacrylate-co-cyclohexyl methacrylate), poly(methyl methacrylate-co-benzyl methacrylate), poly(methyl methacrylate-co-styrene), poly(methyl methacrylate-co-4-methylstyrene), poly(methyl methacrylate-co-4-tert-butylstyrene), poly(ethyl methacrylate-co-butyl methacrylate), poly(ethyl methacrylate-co-isobutyl methacrylate), poly(ethyl methacrylate-co-t-butyl methacrylate), poly(ethyl methacrylate-co-2-ethylhexyl acrylate), poly(ethyl methacrylate-co-2-ethylhexyl methacrylate), poly(ethyl methacrylate-co-cyclohexyl methacrylate), poly(ethyl methacrylate-co-benzyl methacrylate), poly(ethyl methacrylate-co-styrene), poly (ethyl methacrylate-co-4-methylstyrene), poly(ethyl methacrylate-co-4-tert-butylstyrene), poly(butyl methacrylate-co-isobutyl methacrylate), poly(butyl methacrylate-co-t-butyl methacrylate), poly(ethyl methacrylate-co-2-ethylhexyl acrylate), poly(butyl methacrylate-co-2-ethylhexyl methacrylate), poly(butyl methacrylate-co-cyclohexyl methacrylate), poly(butyl methacrylate-co-benzyl methacrylate), poly(butyl methacrylate-co-styrene), poly(butyl methacrylate-co-4-methylstyrene), poly(butyl methacrylate-co-4-tert-butylstyrene), poly(isobutyl methacrylate-co-t-butyl methacrylate), poly(isobutyl methacrylate-co-2-ethylhexyl acrylate), poly(isobutyl methacrylate-co-2-ethylhexyl methacrylate), poly(isobutyl methacrylate-co-cyclohexyl methacrylate), poly(isobutyl methacrylate-co-benzyl methacrylate), poly(isobutyl methacrylate-co-styrene), poly(isobutyl methacrylate-co-4 -methylstyrene), poly(isobutyl methacrylate-co-4-tert-butylstyrene), poly(t-butyl methacrylate-co-2-ethylhexyl acrylate), poly(t-butyl methacrylate-co-2-ethylhexyl methacrylate), poly(t-butyl methacrylate-co-cyclohexyl methacrylate), poly(t-butyl methacrylate-co-benzyl methacrylate), poly(t-butyl methacrylate-co-styrene), poly(t-butyl methacrylate-co-4-methylstyrene), poly(t-butyl methacrylate-co-4-tert-butylstyrene), poly(2-ethylhexyl methacrylate-co-2-ethylhexyl acrylate), poly(2-ethylhexyl methacrylate-co-cyclohexyl methacrylate), poly(2-ethylhexyl methacrylate-co-benzyl methacrylate), poly(2-ethylhexyl methacrylate-co-styrene), poly(2-ethylhexyl methacrylate-co-4-methylstyrene), poly(2-ethylhexyl methacrylate-co-4-tert-butylstyrene), poly(2-ethylbutyl methacrylate-co-t-butyl methacrylate), poly(2-ethylbutyl methacrylate-co-2-ethylhexyl acrylate), poly(2-ethylbutyl methacrylate-co-2-ethylhexyl methacrylate), poly(2-ethylbutyl methacrylate-co-cyclohexyl methacrylate), poly(2-ethylbutyl methacrylate-co-benzyl methacrylate), poly(2-ethylbutyl methacrylate-co-styrene), poly(2-ethylbutyl methacrylate-co-4-methylstyrene), poly(2-ethylbutyl methacrylate-co-4-tert-butylstyrene), poly(cyclohexyl methacrylate-co-benzyl methacrylate), poly(cyclohexyl methacrylate-co-styrene), poly(cyclohexyl methacrylate-co-4-methylstyrene), poly (cyclohexyl methacrylate-co-4-tert-butylstyrene), poly (cyclohexyl methacrylate-co-benzyl methacrylate), poly (benzyl methacrylate-co-styrene), poly(benzyl methacrylate-co-4-methylstyrene), poly(benzyl methacrylate-co-4-tert-butylstyrene), poly(benzyl methacrylate-co-benzyl methacrylate), poly(octadecyl methacrylate-co-styrene), poly(octadecyl methacrylate-co-4-methylstyrene), poly(octadecyl methacrylate-co-tert-butylstyrene), poly(hexyl methacrylate-co-methyl methacrylate), poly(hexyl methacrylate-co-ethyl methacrylate), poly(hexyl methacrylate-co-butyl methacrylate), poly(hexyl methacrylate-co-isobutyl methacrylate), poly(hexyl methacrylate-co-t-butyl methacrylate), poly(hexyl methacrylate-co-2-ethylhexyl methacrylate), poly(hexyl methacrylate-co-2-ethylhexyl methacrylate), poly(hexyl methacrylate-co-cyclohexyl methacrylate), poly(hexyl methacrylate-co-benzyl methacrylate), poly(hexyl methacrylate-co-styrene methacrylate), poly(hexyl methacrylate-co-4-methylstyrene methacrylate), poly(hexyl methacrylate-co-4-tert-methylstyrene methacrylate), poly(vinyl cinnamate-co-methyl methacrylate), polystyrene (poly($\alpha$-methylstyrene), poly(vinylbiphenyl), poly(vinylfolmal), poly (acenaphthylene), poly(vinyl cinnamate-co-ethyl methacrylate), poly(vinyl cinnamate-co-butyl methacrylate), poly(vinyl cinnamate-co-isobutyl methacrylate), poly(vinyl cinnamate-co-butyl methacrylate), poly(vinyl cinnamate-co-2-ethylhexyl methacrylate), poly(vinyl cinnamate-co-2-ethylbutyl methacrylate), poly(vinylcarbasol), poly(vinyl cinnamate-co-cyclohexyl methacrylate), poly(vinyl cinnamate-co-benzyl methacrylate), poly(vinyl cinnamate-co-styrene), poly(vinyl cinnamate-co-4-methylstyrene), poly(vinyl cinnamate-co-4-tert-butylstyrene), poly (perfluorohexylethylene-co-styrene), poly (perfluorohexylethylene-co-4-methylstyrene), and poly (perfluorohexylethylene-co-4-tert-methylstyrene). Polymer (B) also may further contain fluorine atoms. In the present invention, the polymer (A) and the polymer (B) may be used by mixing one kind of each of the polymers, or may be used as a combination of two or more kinds of each of the polymers.

Also, in the alignment layer material of the present invention, the mixing ratio of the polymer (A) and the polymer (B) is from 1:20 to 100:1, and preferably from 1:2 to 50:1.

In the present invention, a layer obtained by coating a mixed solution prepared by mixing the above-described polymer (A) and polymer (B) forms a phase separation structure, and the portion of the phase separated polymer (B) shows an orientation direction different from the rubbing direction and, thus, generates a micro domain. In these domains, a liquid crystal orientation state of a 4-orientation or 2 orientation state exists, and, it is considered that the viewing angle can be improved by this orientation state. The size of the micro domain is 500 μm or less, preferably 100 μm or less.

The present invention is further illustrated in more detail by the following Examples and Comparative Examples, but these examples are not to be construed as limiting the present invention. Also, examples for the synthesis of alignment layer materials are described below.

SYNTHESIS EXAMPLE 1

$\alpha,\omega$-Bis(3-aminopropyl)polydimethylsiloxane (produced by Shin-Etsu Chemical Co. Ltd., Mn=1652, hereinafter referred to as PDMS-diamine 1) was used as a siloxane compound. PDMS-diamine 1 was reacted with chlorotrimethylsilane in toluene while heating under refluxing in the presence of triethylamine to effect trimethylsilylation at the terminal of the diamine (hereinafter referred to as a silylated PDMS-1). In the same manner, an amino group of 4,4'-diaminophenyl ether was silylated. 1.80 g of silylated PDMS-1 and 10.32 g of silylated 4,4'-diaminophenyl ether were dissolved in 150 ml of diethylene glycol dimethyl ether in a flask while stirring under a nitrogen atmosphere. Then, 6.76 g of pyromellitic dianhydride was added thereto, and the mixture was polymerized at 30° C. for 3.5 hours. The reaction solution was poured into an excess amount of methanol to precipitate the reaction product, and the product was washed with methanol and dried under vacuum at 40° C. for 20 hours to obtain a polysiloxane-polyamidoacid trimethyl ester type block copolymer (hereinafter referred to as Polymer 1).

The resulting Polymer 1 was dissolved in dimethylacetamide to prepare a solution of 0.5 g/dl, and an intrinsic viscosity of the solution was measured and found to be 0.58 dl/g.

SYNTHESIS EXAMPLE 2

$\alpha,\omega$-Bis(3-aminopropyl)polydimethylsiloxane (produced by Shin-Etsu Chemical Co. Ltd., Mn=824, hereinafter referred to as PDMS-diamine 2) was used as a siloxane compound. In the same manner as in Synthesis Example 1, a silylated PDMS-diamine 2 was obtained. Also, 2,2-bis(4-aminophenyl)-1,1,1,3,3,3-hexafluoropropane and 2,2-bis(3,4-carboxyphenyl)--1,1,1,3,3,3-hexafluoropropane were used as polyimide components. 4.92 g of silylated PDMS-diamine 2, 13.68 g of silylated 2,2-bis(4-aminophenyl)-1,1,1,3,3,3-hexafluoropropane and 13.23 g of 2,2-bis(3,4-carboxyphenyl)-1,1,1,3,3,3-hexafluoropropane were reacted to obtain a polysiloxane-polyimide type block copolymer (hereinafter referred to as Polymer 2).

The intrinsic viscosity of the resulting Polymer 2 was measured in the same manner as described in Synthesis Example 1 and found to be 0.65 dl/g.

SYNTHESIS EXAMPLE 3

α,ω-Bis(3-aminopropyl)polydimethylsiloxane (produced by Shin-Etsu Chemical Co. Ltd., Mn=2900, hereinafter referred to as PDMS-diamine 3) was used as a siloxane compound. 7.91 g of isophthalic acid, 0.254 g of lithium chloride and 40 ml of 1,3-dimethyl-2-imidazolidone (DMI) were placed in a flask, and heated while stirring at 200° C. under a nitrogen atmosphere. Then, to the resulting mixture was added dropwise a solution of 12.51 g of 4,4'-diphenylmethane diisocyanate in 140 ml of DMI while stirring, and, after ten and several minutes, the reaction solution was quickly cooled to room temperature. Further, a solution of 6.48 g of PDMS-diamine 3 in 40 ml of 1,2-bis(2-methoxyethoxy)ethane was added dropwise thereto, and the resulting mixture was reacted while stirring at room temperature for 3 hours. The reaction solution was poured into an excess amount of methanol to precipitate the reaction product, and the product was washed with methanol and dried under vacuum at 40° C. for 20 hours to obtain a polysiloxane-polyurea type block copolymer (hereinafter referred to as Polymer 3).

The intrinsic viscosity of the resulting Polymer 3 was measured in the same manner as described in Synthesis Example 1 and found to be 0.52 dl/g.

SYNTHESIS EXAMPLE 4

α,ω-Bis(3-hydroxypropyl)polydimethylsiloxane (produced by Toshiba Silicone Co., Ltd., Mn=1700, hereinafter referred to as Dihydroxy-PDMS 1) was used as a siloxane compound. 2.07 g of Dihydroxy-PDMS 1, 8.70 g of 2,4-tolylene diisocyanate and 100 ml of a mixed solvent of THF/DMAc (3:1) were placed in a flask, and 1wt % tin octanoate and triethylamine were added thereto. The resulting mixture was then reacted at 50° C. for 1 hour. 11.14 g of 2,2-bis(4-hydroxyphenyl)propane was added to the reaction mixture, followed by reacting for further 7 hours. The reaction mixture was concentrated under vacuum, and poured into an excess amount of methanol to precipitate a reaction product. The product was washed with methanol and dried at 40° C. for 20 hours to obtain a polysiloxane-polyurethane type block copolymer (hereinafter referred to as Polymer 4).

The intrinsic viscosity of the resulting Polymer 4 was measured in the same manner as described in Synthesis Example 1 and found to be 0.67 dl/g.

SYNTHESIS EXAMPLE 5

2.0 g of Dihydroxy-PDMS 4, 5.33 g of hydroquinone and 350 ml of a mixed solvent of TCE and pyridine were placed in a flask and dissolved with stirring. To the resulting solution was added dropwise a solution of 17.66 g of 2,2-bis(p-chloroformyloxyphenyl)propane in 150 ml of TCE, and triethylamine was added thereto as a catalyst, followed by reacting the mixture under a nitrogen atmosphere at room temperature for 8 hours. Acetone was added to the reaction solution to precipitate a reaction product, and the product was washed with acetone and then pure water and dried under vacuum at 40° C. for 20 hours to obtain a polysiloxane-polycarbonate type block copolymer (hereinafter referred to as Polymer 5).

The intrinsic viscosity of the resulting Polymer 5 was measured in the same manner as described in Synthesis Example 1 and found to be 0.60 dl/g.

SYNTHESIS EXAMPLE 6

Synthesis of Poly(cyclohexyl methacrylate-co-methyl methacrylate)

18.428 g (0.1 mol) of cyclohexyl acrylate, 20.024 g (0.2 mol) of methyl methacrylate and 164 mg of AIBN were dissolved in 100 ml of tetrahydrofuran at 20° C. The resulting solution was purged with nitrogen for 1 hour. Then, the solution was heat refluxed at 65° C. for 7 hours. The solution was cooled to 20° C., and subsequently the solution was poured into 800 ml of methanol to precipitate poly(cyclohexyl methacrylate-co-methyl methacrylate). In order to increase the purity of the poly(cyclohexyl methacrylate-co-methyl methacrylate), the resulting poly(cyclohexyl methacrylate-co-methyl methacrylate) was dissolved in 100 ml of tetrahydrofurn and then precipitated from 800 ml of methanol. Finally, the resulting poly(cyclohexyl methacrylate-co-methyl methacrylate) was collected and dried in vacuum at 60° C. A proportion (a molar ratio) of two comonomers in the poly(cyclohexyl methacrylate-co-methyl methacrylate) was 0.60 of cyclohexyl methacrylate and 0.40 of methyl methacrylate.

The molecular weight of the resulting copolymer was measured and found to be 60,000, and the glass transition point thereof was found to be 118° C.

EXAMPLE 1

Polymer 1 obtained in Synthesis Example 1 and the poly(methyl methacrylate-co-vinyl cinnamate) [methyl methacrylate: vinyl cinnamate=0.6:0.4; a molecular weight, 45,000; a glass transition point, 139° C.] obtained in the same manner as in Synthesis Example 6 were mixed at a ratio of 5:1 (by weight), and the mixture was dissolved in N-methylpyrrolidone in an amount of 2% by weight to obtain a solution. The viscosity of the resulting solution was 10 cp (at 25° C.). The solution was coated on a glass substrate having a transparent electrode by using a spin-coater at 1500 r.p.m./20 seconds, and dried at 180° C. for 1 hour. The film thickness of the resulting coating layer was about 50 nm. The adhesion of the resulting coating layer to the glass substrate was measured by the cross-cut method, i.e., by measuring a number of the peeled-off layer of 100 cross-cut layers, and found that the number of the peeled-off layer was 0. Also, the coating layer was rubbed with a nylon cloth in one direction, and printed a thermosetting type sealing agent after spreading spacers of 5.5 μm thereon, a cell was prepared in such a manner that the rubbing direction was orthogonal. The condition for curing the seal was 150° C./2 hours. A nematic liquid crystal (ZLI 4792, produced by Merck Co.) was filled in the cell by using the vacuum injection method, and the cell was subjected to an isotropic treatment at 110° C./30 minutes. The size of a micro domain was measured and found to be about 50 μm. With respect to the viewing angle of the resulting liquid crystal cell, the contrast ratio when the voltage of 2.5V is applied was measured in all directions at a viewing angle of 45°. As a result, it was confirmed that there was substantially no difference in the contrast in all directions and the viewing angle was widened.

EXAMPLE 2

Polymer 2 obtained in Synthesis Example 2 and the poly(methyl methacrylate-co-benzyl methacrylate) [methyl methacrylate: benzyl methacrylate=0.45:0.55; a molecular weight, 51,000; a glass transition point, 92° C.] obtained in the same manner as in Synthesis Example 6 were mixed at a ratio of 5 to 1 (by weight), and the mixture was dissolved in N-methylpyrrolidone in an amount of 2% by weight to obtain a solution. The viscosity of the resulting solution was 13 cp (at 25° C.). Using the resulting solution, a liquid crystal cell was prepared and evaluated in the same manner as described in Example 1. A number of the peeled-off layer was measured by the cross-cut method and found to be 0. The size of a micro domain was measured and found to be about 75 μm. With respect to the viewing angle of the resulting liquid crystal cell, the contrast ratio when the voltage of 2.5V is applied was measured in all directions at a viewing angle of 45°. As a result, it was confirmed that there was substantially no difference in the contrast in all directions and the viewing angle was widened.

EXAMPLE 3

Polymer 3 obtained in Synthesis Example 3 and the poly(methyl methacrylate-co-cyclohexyl methacrylate) obtained in Synthesis Example 6 were mixed at a ratio of 7 to 1 (by weight), and the mixture was dissolved in N-methylpyrrolidone in an amount of 2% by weight to obtain a solution. The viscosity of the resulting solution was 9 cp (at 25° C.). Using the resulting solution, a liquid crystal cell was prepared and evaluated in the same manner as described in Example 1. A number of the peeled-off layer of the 100 cross-cut coated layers was measured by the cross-cut method and found to be 0. The size of a micro domain was measured and found to be about 40 μm. With respect to the viewing angle of the resulting liquid crystal cell, the contrast ratio when the voltage of 2.5V is applied was measured in all directions at a viewing angle of 45°. As a result, it was confirmed that there was substantially no difference in the contrast in all directions and the viewing angle was widened.

EXAMPLE 4

Polymer 4 obtained in Synthesis Example 4 and the poly(methyl methacrylate-co-isobutyl methacrylate) [methyl methacrylate: isobutyl methacrylate=0.60:0.40; a molecular weight, 70,000; a glass transition point, 83° C.] obtained in the same manner as in Synthesis Example 6 were mixed at a ratio of 3 to 1 (by weight), and the mixture was dissolved in N-methylpyrrolidone in an amount of 2% by weight to obtain a solution. The viscosity of the resulting solution was 13 cp (at 25° C.). Using the resulting solution, a liquid crystal cell was prepared and evaluated in the same manner as described in Example 1. A number of the peeled-off layer of the 100 cross-cut coated layers was measured by the cross-cut method and found to be 0. The size of a micro domain was measured and found to be about 100 μm. With respect to the viewing angle of the resulting liquid crystal cell, the contrast ratio when the voltage of 2.5V is applied was measured in all directions at a viewing angle of 45°. As a result, it was confirmed that there was substantially no difference in the contrast in all directions and the viewing angle was widened.

EXAMPLE 5

Polymer 5 obtained in Synthesis Example 5 and the poly(benzyl methacrylate-co-styrene) [benzyl methacrylate:styrene=0.40:0.60; a molecular weight, 45,000; a glass transition point, 132° C.] obtained in the same manner as in Synthesis Example 6 were mixed at a ratio of 10 to 1 (by weight), and the mixture was dissolved in N-methylpyrrolidone in an amount of 2% by weight to obtain a solution. The viscosity of the resulting solution was 12 cp (at 25° C.). Using the resulting solution, a liquid crystal cell was prepared and evaluated in the same manner as described in Example 1. A number of the peeled-off layer was measured by the cross-cut method and found to be 0. The size of a micro domain was measured and found to be about 50 μm. With respect to the viewing angle of the resulting liquid crystal cell, the contrast ratio when the voltage of 2.5V is applied was measured in all directions at a viewing angle of 45°. As a result, it was confirmed that there was substantially no difference in the contrast in all directions and the viewing angle was widened.

EXAMPLE 6

Polymer 2 obtained in Synthesis Example 2 and the poly(cyclohexyl methacrylate) (a product of Aldrich Co., Ltd.) were mixed at a ratio of 10 to 1 (by weight), and the mixture was dissolved in N-methylpyrrolidone in an amount of 2% by weight to obtain a solution. The viscosity of the resulting solution was 11 cp (at 25° C.). Using the resulting solution, a liquid crystal cell was prepared and evaluated in the same manner as described in Example 1. A number of the peeled-off layer was measured by the cross-cut method and found to be 0. The size of a micro domain was measured and found to be about 50 μm. With respect to the viewing angle of the resulting liquid crystal cell, the contrast ratio when the voltage of 2.5V is applied was measured in all directions at a viewing angle of 45°. As a result, it was confirmed that there was substantially no difference in the contrast in all directions and the viewing angle was widened.

EXAMPLE 7

Polymer 1 obtained in Synthesis Example 1 and poly(4-vinylbiphenyl) were mixed at a ratio of 10 to 1 (by weight), and the mixture was dissolved in N-methylpyrrolidone in an amount of 2% by weight to obtain a solution. The viscosity of the resulting solution was 9 cp (at 25° C.). Using the resulting solution, a liquid crystal cell was prepared and evaluated in the same manner as described in Example 1. A number of the peeled-off layer was measured by the cross-cut method and found to be 0. With respect to the viewing angle of the resulting liquid crystal cell, the contrast ratio when the voltage of 2.5V is applied was measured in all directions at a viewing angle of 45°. As a result, it was confirmed that the viewing angle was widened. Also, at this time, 4 orientation states of the liquid crystal were found.

EXAMPLE 8

Polymer 1 obtained in Synthesis Example 1 and the poly(vinylformal) were mixed at a ratio of 10 to 1 (by weight), and the mixture was dissolved in N-methylpyrrolidone in an amount of 2% by weight to obtain a solution. The viscosity of the resulting solution was 9 cp (at 25° C.). Using the resulting solution, a liquid crystal cell was prepared and evaluated in the same manner as described in Example 1. A number of the peeled-off layer was measured by the cross-cut method and found to be 0. With respect to the viewing angle of the resulting liquid crystal cell, the contrast ratio when the voltage of 2.5V is applied was measured in all directions at a viewing angle of 45°. As a result, it was confirmed that the viewing angle was widened. Also, at this time, 4 orientation states of the liquid crystal were found.

EXAMPLE 9

Polymer 1 obtained in Synthesis Example 1 and the poly(acenaphthylene) were mixed at a ratio of 10 to 1 (by weight), and the mixture was dissolved in N-methylpyrrolidone in an amount of 2% by weight to obtain a solution. The viscosity of the resulting solution was 9 cp (at 25° C.). Using the resulting solution, a liquid crystal cell was prepared and evaluated in the same manner as described in Example 1. A number of the peeled-off layer was measured by the cross-cut method and found to be 0. With respect to the viewing angle of the resulting liquid crystal cell, the contrast ratio when the voltage of 2.5V is applied was measured in all directions at a viewing angle of 45°. As a result, it was confirmed that the viewing angle was widened. Also, at this time, 4 orientation states of the liquid crystal were found.

EXAMPLE 10

Polymer 1 obtained in Synthesis Example 1 and poly (phenyl methacrylate) were mixed at a ratio of 10 to 1 (by weight), and the mixture was dissolved in N-methylpyrrolidone in an amount of 2% by weight to obtain a solution. The viscosity of the resulting solution was 9 cp (at 25° C.). Using the resulting solution, a liquid crystal cell was prepared and evaluated in the same manner as described in Example 1. A number of the peeled-off layer was measured by the cross-cut method and found to be 0. With respect to the viewing angle of the resulting liquid crystal cell, the contrast ratio when the voltage of 2.5V is applied was measured in all directions at a viewing angle of 45°. As a result, it was confirmed that the viewing angle was widened. Also, at this time, 4 orientation states of the liquid crystal were found.

COMPARATIVE EXAMPLE 1

A copolymer of 2,2-bis(4-aminophenyl)-1,1,1,3,3,3-hexafluoropropane and 2,2-bis(3,4-dicarboxyphenyl)-1,1,1,3,3,3-hexafluoropropane was synthesized, and a liquid crystal cell was prepared and evaluated in the same manner as described in Example 1. A number of the peeled-off layer of the 100 cross-cut coated layers was measured by the cross-cut method and found to be 14. With respect to the viewing angle of the resulting liquid crystal cell, the contrast was measured in all directions at an angle of 45° when an angle to the front surface is referred to as 90° and an angle parallel to the cell is referred to as 0°. As a result, it was confirmed that a gray scale inversion was observed in specific directions.

We claim:

1. An alignment layer material of a liquid crystal display device having a liquid crystal layer between a pair of substrates wherein a transparent electrode and the alignment layer are formed in this order on the inside thereof, wherein the alignment layer comprises a mixture of a polymer (A) which is a block copolymer comprising a siloxane compound as a constituting component, and a homopolymer or copolymer (B) comprising the following repeating unit (1):

wherein X represents —H, —F, —CH$_3$, —CF$_3$, —CN or —CH$_2$—CH$_3$;

Z represents a single bond, —O—, —(C=O)—, —(C=O)—O—, —O—(C=O)—, or —O—(C=O)—(CH$_2$)$_n$—(C=O)—O— (wherein n is an integer of from 0 to 20); and R$^1$ represents a hydrogen atom, a straight chain or a branched alkyl group, a straight chain or branched unsaturated aliphatic hydrocarbon group, a cycloalkyl group, an aryl group, a saturated or unsaturated hetero ring or an aryl group or hetero ring which is substituted with 1, 2 or 3 groups —X, —R$^1$ or Z—R$^1$.

2. An alignment layer as claimed in claim 1, wherein said polymer (A) further comprises fluorine atoms.

3. A liquid crystal display device having a liquid crystal layer between a pair of substrates wherein a transparent electrode and an alignment layer are formed in this order on the inside thereof, and wherein the alignment layer is as claimed in claim 1.

4. An alignment layer as claimed in claim 1, wherein the aliphatic hydrocarbon group of R$^1$ has from 1 to 20 carbon atoms.

5. An alignment layer as claimed in claim 1, wherein the cycloalkyl group of R$^1$ has from 3 to 10 carbon atoms.

6. An alignment layer as claimed in claim 1, wherein the aryl group of R$^1$ has from 6 to 10 carbon atoms.

7. An alignment layer as claimed in claim 1, wherein the hetero ring of R$^1$ has from 4 to 10 carbon atoms and 1, 2 or 3 N, O and/or S atoms.

8. An alignment layer as claimed in claim 1, wherein polymer (A) is a polyamide, polyurethane, polyester, polyimide, polycarbonate, polyurea or polyimidoamide.

9. An alignment layer as claimed in claim 1, wherein polymer (A) is obtained by polymerizing compounds of the formula (2) as one of the components:

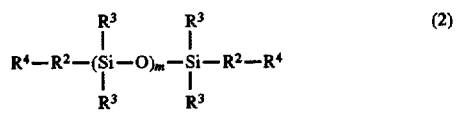

wherein m is an integer of 1 or more;

R$^2$ is a divalent hydrocarbon group;

R$^3$ is a monovalent straight chain or branched chain aliphatic hydrocarbon group having from 1 to 5 carbon atoms, an alicyclic hydrocarbon group or an aromatic hydrocarbon group; and R$^4$ is —NH$_2$, —OH, —COOH, Ar(COOH)$_2$, AR(CO)$_2$O or —NHSi(CH$_3$)$_3$ wherein Ar represents an aromatic group.

10. An alignment layer as claimed in claim 9, wherein R$^2$ is an alkylene group having from 1 to 10 carbon atoms.

11. An alignment layer as claimed in claim 1, wherein the content of the siloxane constituting unit in the composition is from 0.1% to 80% by weight.

12. An alignment layer as claimed in claim 1, wherein the content of the siloxane constituting unit in the composition is from 1% to 50% by weight.

13. An alignment layer as claimed in claim 1, wherein the intrinsic viscosity of the polymer (A) is from 0.05 dl/g to 10 dl/g (at 30° C.; as 0.5 g/dl solution in dimethyl acetamide).

14. An alignment layer as claimed in claim 1, wherein the intrinsic viscosity of the polymer (A) is from 0.05 dl/g to 5.0 dl/g (at 30° C.; as 0.5 g/dl solution in dimethyl acetamide).

15. An alignment layer as claimed in claim 1, wherein polymer (A) has two or more glass transition points.

16. An alignment layer as claimed in claim 1, wherein polymer (B) has a molecular weight of from 1,000 to 500,000.

17. An alignment layer as claimed in claim 1, wherein polymer (B) has a molecular weight of from 10,000 to 200,000.

18. An alignment layer as claimed in claim 1, wherein the mixing ratio of the polymer (A) and the polymer (B) is from 1:20 to 100:1.

19. An alignment layer as claimed in claim 1, wherein the mixing ratio of the polymer (A) and the polymer (B) is from 1:2 to 50:1.

* * * * *